US006756105B1

(12) United States Patent
Haataja

(10) Patent No.: US 6,756,105 B1
(45) Date of Patent: Jun. 29, 2004

(54) ARTICLE AND METHOD USING LARGER DRAFT ANGLE TO PINCH TRIM EDGE OF MOLDED WOOD STRAND PRODUCTS

(76) Inventor: Bruce A. Haataja, Rte. 1, Box 18, Lake Linden, MI (US) 49945

( * ) Notice: Subject to any disclaimer, the term of this patent is extended or adjusted under 35 U.S.C. 154(b) by 0 days.

(21) Appl. No.: 10/019,755

(22) PCT Filed: May 2, 2000

(86) PCT No.: PCT/US00/12056

§ 371 (c)(1),
(2), (4) Date: Dec. 27, 2001

(87) PCT Pub. No.: WO01/83176

PCT Pub. Date: Nov. 8, 2001

(51) Int. Cl.[7] .......................... B32B 1/04; B32B 21/13; B29B 11/00

(52) U.S. Cl. ....................... 428/174; 428/192; 428/212; 428/213; 428/220; 428/332; 264/118; 264/123; 264/126

(58) Field of Search ................................ 264/118, 123, 264/126; 428/174, 192, 212, 213, 220, 332

(56) References Cited

U.S. PATENT DOCUMENTS 3,164,511 A 1/1965 Elmendorf
3,238,281 A 3/1966 Kato
4,131,705 A 12/1978 Kubinsky
4,213,928 A 7/1980 Casselbrant
4,241,133 A 12/1980 Lund et al.
4,246,310 A 1/1981 Hunt et al.
4,248,163 A 2/1981 Caughey et al.
4,248,820 A 2/1981 Haataja
4,337,710 A 7/1982 Haataja et al.
4,384,019 A 5/1983 Haataja
4,408,544 A 10/1983 Haataja
4,440,708 A 4/1984 Haataja et al.
4,469,216 A 9/1984 Haataja et al.
4,790,966 A 12/1988 Sandberg et al.
4,960,553 A 10/1990 DeBruine et al.
5,543,234 A * 8/1996 Lynch et al. ................ 264/113

* cited by examiner

*Primary Examiner*—Stephen J. Lechert, Jr.
(74) *Attorney, Agent, or Firm*—Price, Heneveld, Cooper, DeWitt & Litton

(57) ABSTRACT

A method of producing molded wood flake or strand three-dimensionally curved products using draft angles of 10 degrees or larger with little or no blistering or wood flake springback from over densification. A loosely felted mat of wood flakes is placed between top and bottom molds which slidably engage one another at pinch points to pinch and sometimes remove excess flashing/pinch trim.

19 Claims, 4 Drawing Sheets

ARTICLE AND METHOD USING LARGER DRAFT ANGLE TO PINCH TRIM EDGE OF MOLDED WOOD STRAND PRODUCTS

FIELD OF THE INVENTION

The present invention relates to the revolutionary wood flake molding technology invented by wood scientists at Michigan Technological University during the latter part of the 1970s.

BACKGROUND OF THE ART

Wood flake molding, also referred to as wood strand molding, is a technique for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.025 inches; and an average width of 3 inches or less, most typically 0.25 to 1.0 inches, and never greater than the average length of the flakes. These flakes are sometimes referred to in the art as a "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e., non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted mat is then covered with another metal tray, and the covered metal tray is used to carry the mat to a mold. (The terms mold and die, as well as mold die, are sometimes used interchangeably herein, reflecting the fact that "dies" are usually associated with stamping, and molds are associated with plastic molding, and molding of wood strands does not fit into either category.) The top metal tray is removed, and the bottom metal tray is then slid out from underneath the mat, to leave the loosely felted mat in position on the bottom half of the mold. The top half of the mold is then used to press the mat into the bottom half of the mold at a pressure of approximately 600 psi, and at an elevated temperature, to "set" (polymerize) the MDI binder, and to compress and adhere the compressed wood flakes into a final three-dimensional molded part. The excess perimeter of the loosely felted mat, that is, the portion extending beyond the mold cavity perimeter, is pinched off where the part defining the perimeter of the upper mold engages the part defining perimeter of the lower mold cavity. This is sometimes referred to as the pinch trim edge.

U.S. Pat. No. 4,440,708 and U.S. Pat. No. 4,469,216 disclose this technology. The drawings in U.S. Pat. No. 4,469,216 best illustrate the manner in which the, wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence which hold them together in the loosely felted mat. The drawings of U.S. Pat. No. 4,440,708 best illustrate the manner in which a loosely felted mat is compressed by the mold halves into a three-dimensionally configured article (see FIGS. 2–7, for example).

This is a very unusual molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

One limitation heretofore associated with this technology has been the need to design parts with only about a three degree (30°) draft angle, i.e. the angle of the mold cavity edge with respect to the vertical, where the edge approaches the pinch trim edge. It has been thought that larger draft angles would lead to blistering, over densification, or springback of the wood flakes from the edge, to cause loss of structural integrity. This has resulted in the inability to use wood strand molding technology to make parts whose configuration would require a greater draft angle to the pinch trim edge.

SUMMARY OF THE INVENTION

In the present invention, it has been surprisingly discovered that molded wood strand products can be produced having minimal blistering, minimal springback, and minimal over densification to the pinch trimmed edges of the finished product utilizing a mold having a draft angle of ten degrees (10°) or greater for at least a portion of its edge which approaches the pinch trim edge.

These and other features, advantages and objects of the present invention will be further understood and appreciated by those skilled in the art by reference to the following specification and claims. A more detailed description of the present invention shall be discussed further below.

DETAILED DESCRIPTION OF THE PREFERRED EMBODIMENTS

Figure 1:
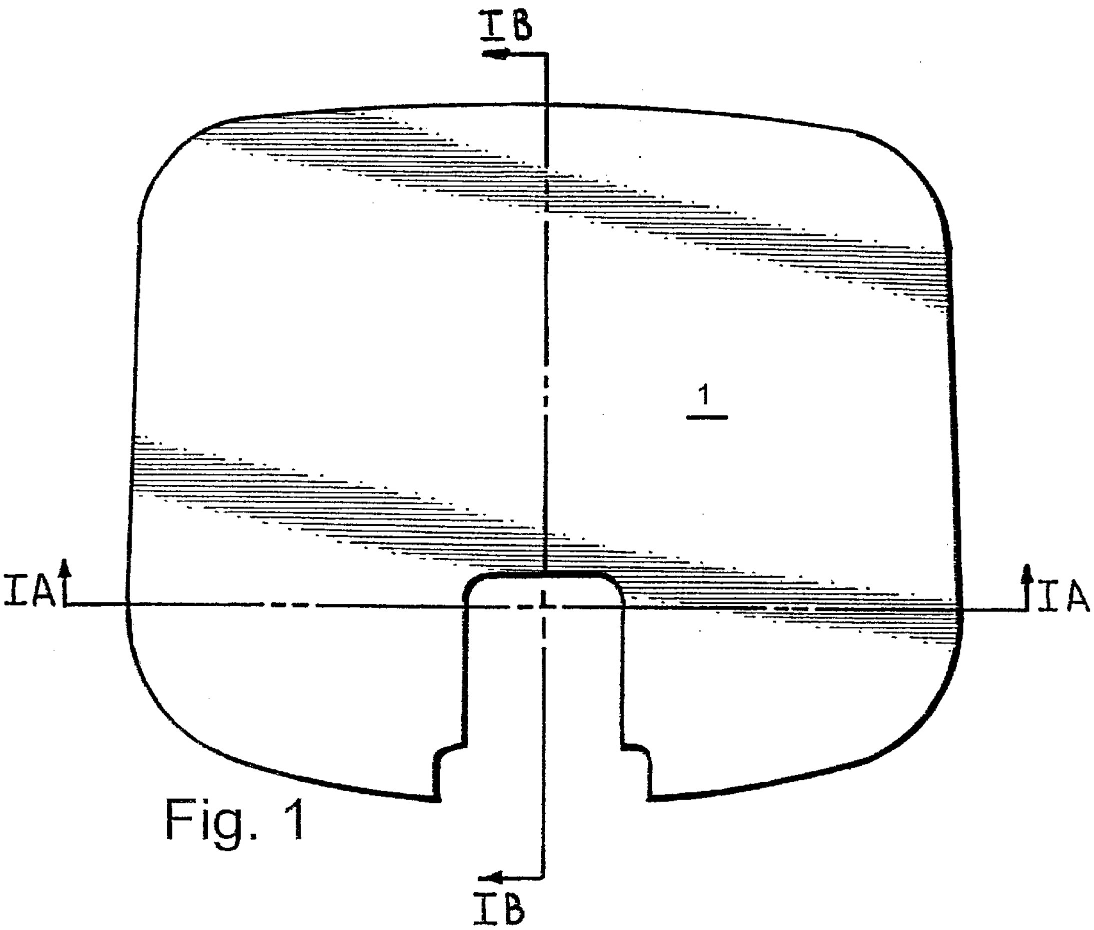
FIG. 1 is a plane view of a part to be molded of wood strands.
Figure 1A:
FIG. 1A is a cross section taken along 1A—1A of FIG. 1.
Figure 4:
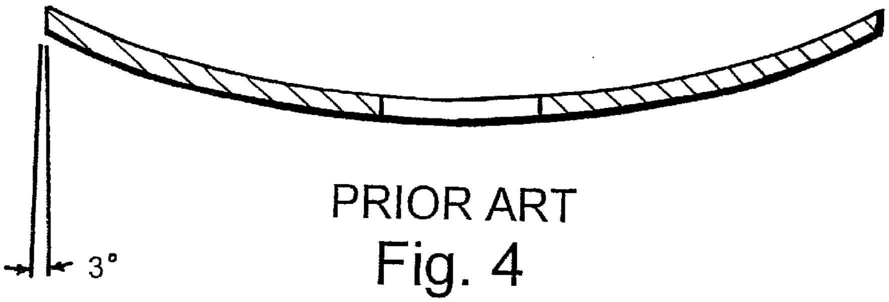
PRIOR ART Fig. 4
FIG. 4 shows a prior art cross section similar to FIG. 1A, showing the three degree (3°) draft angle previously thought necessary at the pinch trim edge.
Figure 1B:
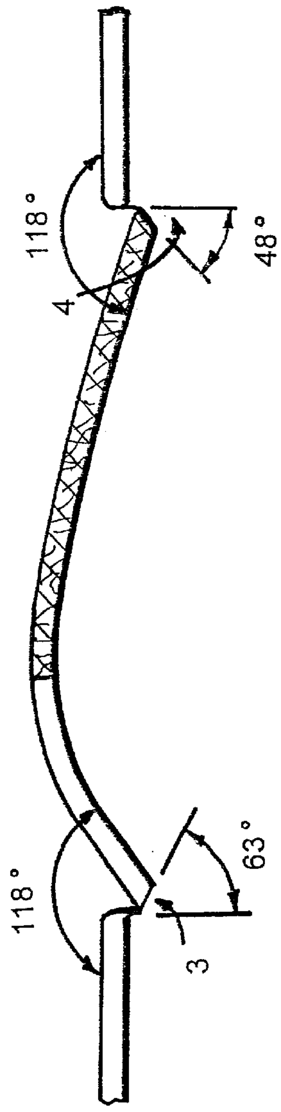
FIG. 1B is a cross section taken along 1B—1B of FIG. 1.
Figure 2:
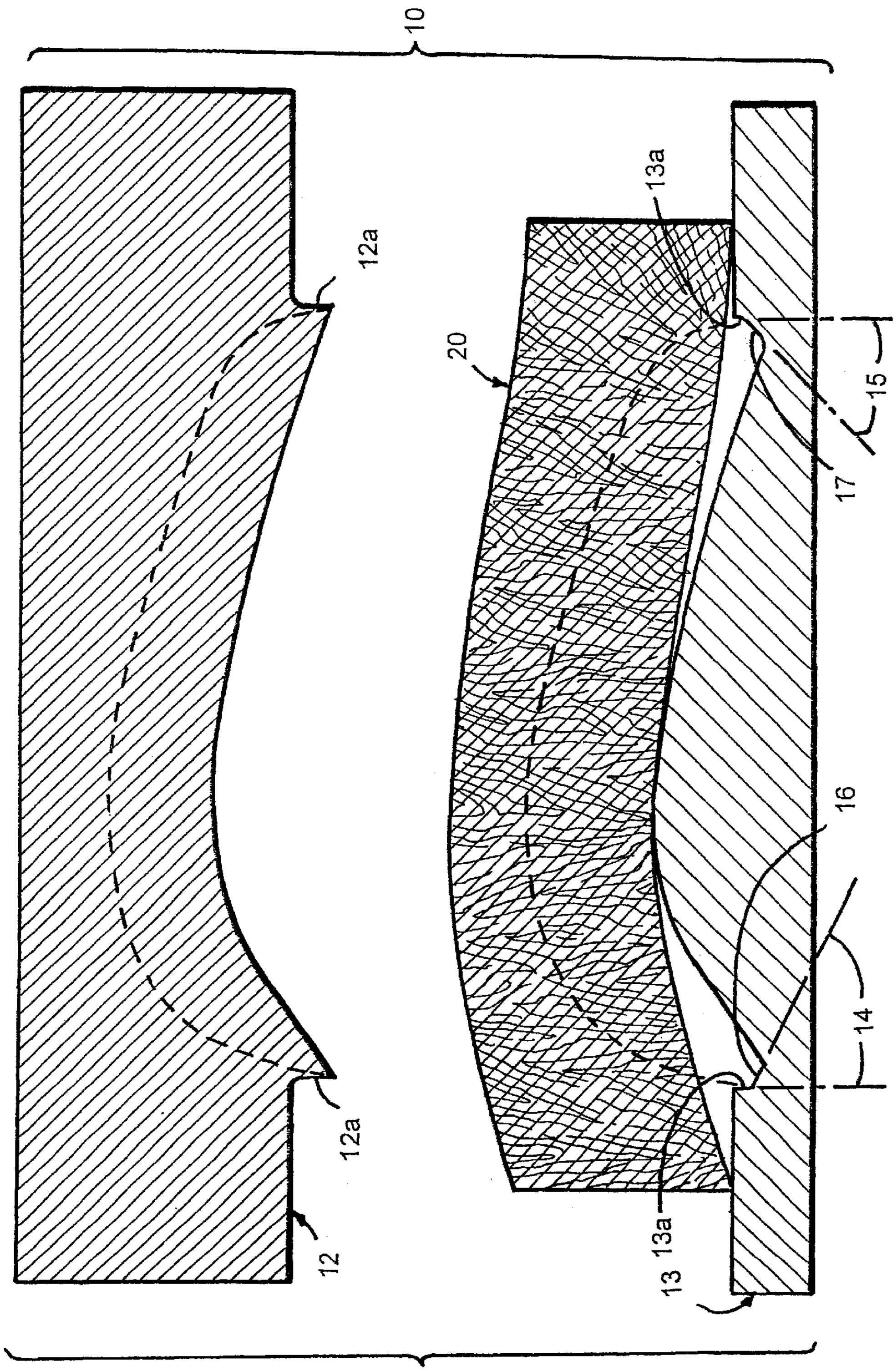
FIG. 2 is an illustration of step 1 in the method of producing molded wood strand products utilizing draft angles of ten degrees (10°) or larger, in which a felted mat of wood strands coated with MDI is placed between the top and bottom dies of the mold.

Part 1 (FIG. 1) made in accordance with a preferred embodiment of the invention has a draft angle 2 of 20° (FIG. 1A), a draft angle 3 at another point of 63°, and a draft angle 4 at another point of 48° (FIG. 1B). This is in contrast to a typical prior art part (FIG. 4), where all of the draft angles to the pinch trim edge were about 3°. FIG. 2 illustrates a mold 10 in accordance with a preferred embodiment of the present invention, having a top mold or die 12, and bottom mold or die 13, which is capable of engaging top mold 12 to mold three-dimensionally curved wood strand products from a loosely felted mat 20 of wood flakes. Mold halves 12 and 13 are mounted on heated platens which press the mold halves together and heat them, to thereby heat and press the loosely felted mat 20.

Figure 3:
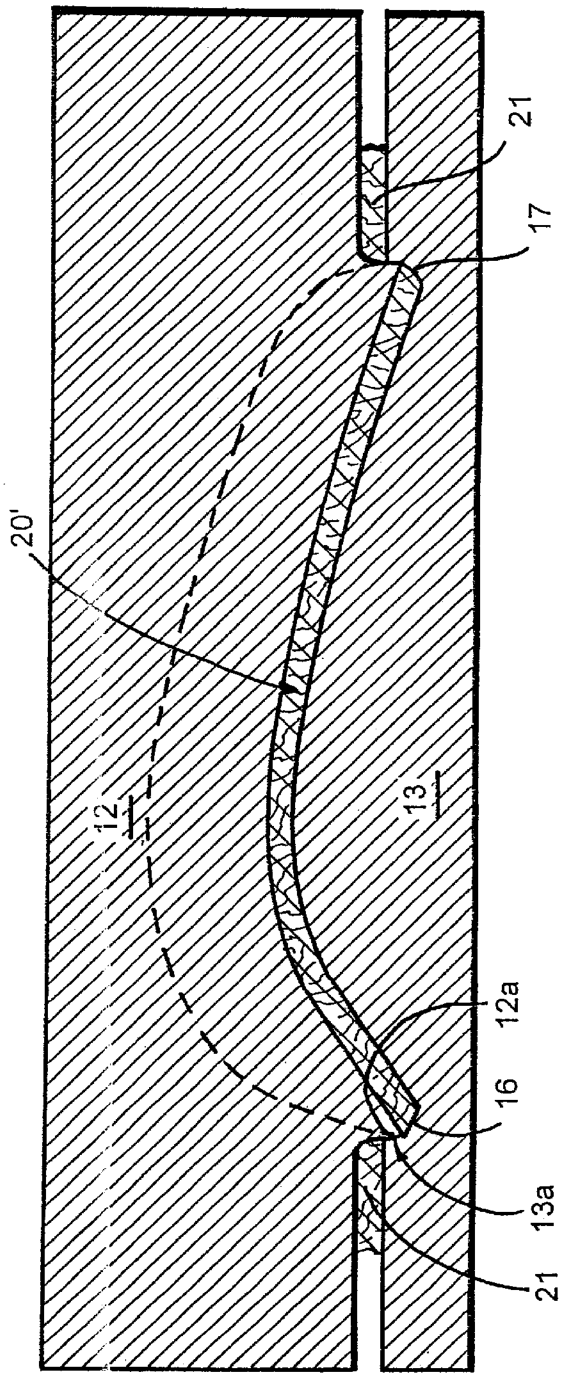
FIG. 3 is an illustration of step 2 of the method, in which the wood strands are consolidated, compressed, and cured under heat and pressure to form the molded wood product.

Top mold 12 and bottom mold 13 slidably engage one another at pinch trim edges 12*a* and 13*a*, respectively, (actually there is a slight space of about 0.030 inches between pinch trim edges 12*a* and 13*a*), while compressing and curing a felted mat 20 of resinous binder coated wood strand flakes placed between top mold 12 and bottom mold 13 (FIG. 3).

Draft angles 14 and 15 (FIG. 2) are the angles with respect to the vertical, at which the edges 16 and 17 of the cavity of bottom mold 13 approach pinch trim edges 12*a* and 13*a*. Pinch trim edges 12*a* and 13*a* are the points at which top mold 12 and bottom mold 13 slidably engage, pinch, and sometimes remove excess flashing/pinch trim 21 from formed part 20' (FIG. 3). Sometimes, the flashing/pinch trim 21 or a portion thereof, has to be cleaned off of the finished part.

At draft angles of 3 degrees or less, a normal molded pinch trimmed edge for a finished product was expected to have an edge density similar to the interior density. At draft angles of 20 degrees, the molded product was expected to have an average edge density of 1.6 times the interior density. Yet, with such increased density creating a stronger product able to withstand greater load upon such an edge, the integrity of the pinched trimmed edge is not compromised during the molding process by blistering or excessive springback from over densification. Such surprising results can be seen in FIG. 1, where draft angles of 20°, 48°, and 63° were used in a molded wood strand product, which did not exhibit blistering or springback from over densification at the pinch trim edges.

Figure 5:
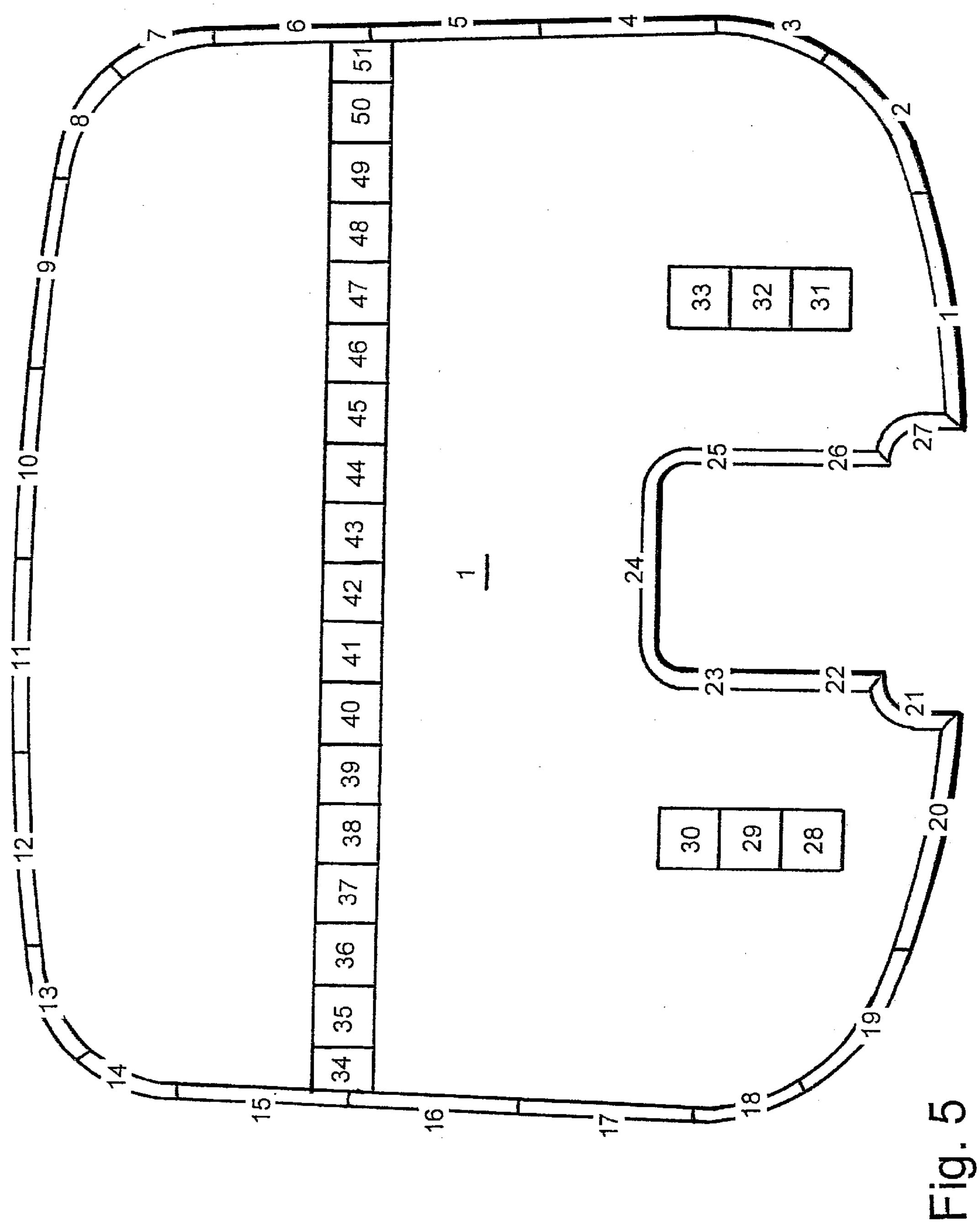
FIG. 5 is a bottom plane view of the part of FIG. 1, in which edge portions and interior portions of part 1 have been numbered to correspond with Table 1, in which the densities of the numbered portions, and the average draft angle of the numbered edge portions, are recorded.

Such surprising results can also be seen below in Table 1, which compares the average density of within various load-bearing sections of molded wood strand product 1 (FIG. 5). As Table 1 indicates, the average density from all of the pinch trimed edge sections was 1.3 times greater than the density of the interior sections. However, what is surprising is that the density of the part where the draft angle is only three degrees (3°) is as great and sometimes greater than where the draft angle is ten degrees (10°) or greater. At three degrees (3°), the average density at the edge is 61 pcf, while at fortyight degrees (48°) and at sixty-three degrees (63°), the density is only 56 pcf and 58 pcf, respectively. Even at twenty degrees (20°), the density is only 62 pcf. This is very suprising, since much higher densities would have been expected at the higher drafted angels.

As a result of this suprising discovery, three dimensionally curved wood strand parts can be molded with draft angles of ten degrees (10°) or greater, without having to worry about blistering or springback from over densification. In fact, the density of the edge portion is just significantly greater than that of the interior of the part to increase the structure integrety of the edge of the part.

TABLE 1

| | Ambient MC Density | | |
|---|---|---|---|
| | Sample No. | Density (pcf) | Draft Angle |
| EDGES | | | |
| Bottom | 1 | 64 | |
| | 20 | 51 | |
| Avg | | 58 | 63 |
| Sides | 4 | 60 | |
| | 5 | 63 | |
| | 6 | 58 | |
| | 15 | 68 | |
| | 16 | 66 | |
| | 17 | 56 | |
| Avg | | 62 | 20 |
| Top | 9 | 57 | |
| | 10 | 51 | |
| | 11 | 55 | |
| | 12 | 60 | |
| Avg | | 56 | 48 |
| Cut Out Sides | 21 | 52 | |
| | 22 | 61 | |
| | 23 | 69 | |
| | 25 | 67 | |
| | 26 | 61 | |
| | 27 | 59 | |
| Avg | | 61 | 3 |
| Top Of Cutout | 24 | 55 | 24 |
| Upper Corners | 7 | 65 | |
| | 8 | 65 | |
| | 13 | 60 | |
| | 14 | 72 | |
| Avg | | 65 | |
| Lower Corners | 2 | 54 | |
| | 3 | 58 | |
| | 18 | 59 | |
| | 19 | 42 | |
| Avg | | 53 | |
| Avg of all edges | | 59 | |
| INTERIOR | 28 | 32 | |
| | 29 | 37 | |
| | 30 | 47 | |
| | 31 | 57 | |
| | 32 | 52 | |
| | 33 | 50 | |
| | 34 | 48 | |
| | 35 | 47 | |
| | 36 | | |
| | 37 | | |
| | 38 | 44 | |
| | 39 | 49 | |
| | 40 | 47 | |
| | 41 | 46 | |
| | 42 | 43 | |
| | 43 | 41 | |
| | 44 | 43 | |
| | 45 | 41 | |
| | 46 | 45 | |
| | 47 | 41 | |
| | 48 | | |
| | 49 | | |
| | 50 | 46 | |
| | 51 | 40 | |
| Avg of Interior | | 45 | |

The wood flakes used can be prepared from various species of suitable hardwoods and softwoods use in the manufacture of particleboard. Representative examples of suitable woods include aspen, maple, oak, elm, balsam fir, pine, cedar, spruce, locust, beech, and mixtures thereof. Aspen is preferred.

Suitable wood flake can be prepared by various conventional techniques. Pulpwood grade logs, or so-called round wood, are converted into flakes in one operation with a conventional roundwood flaker. Logging residue or the total tree is first cut into figerlings in the order of 2–6 inches long with a conventional device, such as the helical communicating shear disclosed in U.S. Pat. No. 4,053,004, and the fingerling are flake in a conventional ring-type flaker.

Roundwood flake generally are higher quality and produce stronger parts beacuse the lenghts and the thickkness can be more accurately controlled. Also, roundwood flake tend to be somewhat flatter, which facilitates more efficient blending and the logs can be debarked prior to flaking which reduces the amount of less desirable fines produced during flaking and handling. Acceptable flakes can be prepared by ring flaking fingerlings and this technique is more readily adaptable to accept wood in poorer form, thereby permitting more complete utilization of certain types of residue and surplus woods.

Irrespective of the particular technique employed for preparing the flakes, the size distribution of the flakes is quite important, particularly the length and thickness. The wood flakes should have an average length of about 1¼ inch to about 6 inches and an average thickness of about 0.005 to about 0.075 inches. The average length of the wood flakes is preferably about 2 to about 3 inches. In any given batch, some of the flakes can be shorter than 1¼ inch, and some can be longer than 6 inches, so long as the overall average length is within the above range. The same is true for the thickness.

The presence of major quantities of flakes having a length shorter than about 1¼ inch tends to cause the mat to pull apart during the molding step. The presence of some fines in the mat produces a smoother surface and, thus, may be desirable for some applications so long as the majority of the wood flakes, preferably at least 75%, is longer than 1⅛ inch and the overall average length is at least 1¼ inch.

Substantial quantities of flakes having a thickness of less than about 0.005 inches should be avoided, because excessive amounts of binder are required to obtain adequate bonding. On the other hand, flakes having a thickness greater than about 0.075 inch are relatively stiff and tend to overlie each other at some incline when formed into the mat. Consequently, excessively high mold pressures are required to compress the flakes into the desired intimate contact with each other. For flakes having a thickness falling within the above range, thinner ones produce a smoother surface while thick ones require less binder. These two factors are balanced against each other for selecting the best average thickness for any particular application. The average thickness of the flakes preferably is about 0.015 to about 0.25 inches, and more preferably about 0.0020 inch.

The width of the flakes is less important. The flakes should be wide enough to ensure that they lie substantially flat when felted during mat formation. The average width generally should be about 3 inches or less and no greater than the average length. For best results, the majority of the flakes should have a width of about 1/16 inch to about 3 inches, and preferably 0.25 to 1.0 inches.

The blade setting on the flaker can primarily control the thickness of the flakes. The length and width of the flakes are also controlled to a large degree by the flaking operation. For example, when the flakes are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure the average length, thickness and width of the flakes are within the desired ranges. When roundwood flaking is used, both screen and air classification usually are required to adequately remove both the undersize and oversize particles, whereas fingerling flakes usually can be properly sized with only screen classification.

Flakes from some green wood can contain up to 90% moisture. The moisture content of the mat must be substantially less for molding as discussed below. Also, wet flakes tend to stick together and complicate classification and handling prior to blending. Accordingly, the flakes are preferably dried prior to classification in a conventional type drier, such as a tunnel drier, to the moisture content desired for the blending step. The moisture content to which the flakes are dried usually is in the order of about 6 weight % or less, preferably about 2 to about 5 weight %, based on the dry weight of the flakes. If desired, the flakes can be dried to a moisture content in the order of 10 to 25 weight % prior to classification and then dried to the desired moisture content for blending after classification. This two-step drying may reduce the overall energy requirements for drying flakes prepared from green woods in a manner producing substantial quantities of particles which must be removed during classification and, thus, need not be as thoroughly dried.

To coat the wood flakes prior to being placed as a felted mat 20 within the cavity of bottom mold 13 within mold apparatus 10 of the preferred embodiment, a known amount of the dried, classified flakes is introduced into a conventional blender, such as a paddle-type batch blender, wherein predetermined amounts of a resinous particle binder, and optionally a wax and other additives, is applied to the flakes as they are tumbled or agitated in the blender. Suitable binders include those used in the manufacture of particle board and similar pressed fibrous products and, thus, are referred to herein as "resinous particle board binders." Representative examples of suitable binders include thermosetting resins such as phenolformaldehyde, resorcinol-formaldehyde, melamine-formaldehyde, urea-formaldehyde, urea-furfuryl and condensed furfuryl alcohol resins, and organic polyisocyantes, either alone or combined with urea- or melamine-formaldehyde resins.

Particularly suitable polyisocyanates are those containing at least two active isocyanate groups per molecule, including diphenylmethane diisocyanates, m- and p- phenylene diisocyanates, chlorophenylene diisocyanates, toluene di- and triisocyanates, triphenylmethene triisocyanates, diphenylether-2,4,4'-trilsoccyanate and polyphenylpolyisocyanates, particularly diphenylmethane-4,4'-diisocyanate. Sowalled MDI is particularly preferred.

The amount of binder added to the flakes during the blending step depends primarily upon the specific binder used, size, moisture content and type of the flakes, and the desired characteristics of the part being formed. Generally, the amount of binder added to the flakes is about 2 to about 15 weight %, preferably about 4 to about 10 weight %, as solids based on the dry weight of the flakes. When a polyisocyanate is used alone or in combination with a urea-formaldehyde resin, the amounts can be more toward the lower ends of these ranges.

The binder can be admixed with the flakes in either dry or liquid form. To maximize coverage of the flakes, the binder preferably is applied by spraying droplets of the binder in liquid form onto the flakes as they are being tumbled or agitated in the blender. When polyisocyantes are used, a conventional mold release agent preferably is applied to the die or to the surface of the felted mat prior to pressing. To improve water resistance of the part, a conventional liquid wax emulsion preferably is also sprayed on the flakes during the blending step. The amount of wax added generally is about 0.5 to about 2 weight %, as solids based on the dry weight of the flakes. Other additives, such as at least one of the following: a coloring agent, fire retardant, insecticide, fungicide, mixtures thereof, and the like may also be added to the flakes during the blending step. The binder, wax and other additives, can be added separately in any sequence or in combined form.

The moistened mixture of binder, wax and flakes or "furnish" from the blending step is formed into a loosely-felted, layered mat 20, which is placed within the cavity of bottom mold 13 prior to the molding and curing of the mat into a molded wood particle product. The moisture content of the flakes should be controlled within certain limits so as to obtain adequate coating by the binder during the blending step and to enhance binder curing and deformation of the flakes during molding.

The presence of moisture in the flakes facilitates their bending to make intimate contact with each other and enhances uniform heat transfer throughout the mat 20 during the molding step, thereby ensuring uniform curing. However, excessive amounts of water tend to degrade some binders, particularly urea-formaldehyde resins, and generate steam which can cause blisters. On the other hand, if the flakes are too dry, they tend to absorb excessive amounts of the binder, leaving an insufficient amount on the surface to obtain good bonding and the surfaces tend to cause hardening which inhibits the desired chemical reaction between the binder and cellulose in the wood. This latter condition is particularly true for polyisocyanate binders.

Generally, the moisture content of the furnish after completion of blending, including the original moisture content of the flakes and the moisture added during blending with the binder, wax and other additives, should be about 5 to about 25 weight %, preferably about 8 to about 12 weight %. Generally, higher moisture contents within these ranges can be used for polyisocyanate binders because they do not produce condensation products upon reacting with cellulose in the wood.

The furnish is formed into a generally flat, loosely-felted, mat, preferably as multiple layers. A conventional dispensing system, similar to those disclosed in U.S. Pat. Nos. 3,391,223 and 3,824,058, and 4,469,216 can be used to form the mat. Generally, such a dispensing system includes trays, each having one open side, carried on an endless belt or conveyor and one or more (e.g., 3) hoppers spaced above and along the belt in the direction of travel for receiving the furnish.

When a multi-layered mat is formed in accordance with a preferred embodiment, a plurality of hoppers usually are used with each having a dispensing or forming head extending across the width of the carriage for successively depositing a separate layer of the furnish as the tray is moved beneath the forming heads. Following this, the tray is taken to the mold to place the felted mat 20 within the cavity of bottom mold 13, by sliding the tray out from under mat 20.

In order to produce molded wood strand products having the desired edge density characteristics without excessive blistering and springback, the felted mat 20 should preferably have a substantially uniform thickness and the flakes should lie substantially flat in a horizontal plane parallel to the surface of the carriage and be randomly oriented relative to each other in that plane. The uniformity of the mat thickness can be controlled by depositing two or more layers of the furnish on the carriage and metering the flow of furnish from the forming heads.

Spacing the forming heads above the carriage so the flakes must drop about 1 to about 3 feet from the heads en route to the carriage can enhance the desired random orientation of the flakes. As the flat flakes fall from that height, they tend to spiral downwardly and land generally flat in a random pattern. Wider flakes within the range discussed above enhance this action. A scalper or similar device spaced above the carriage can be used to ensure uniform thickness or depth of the mat, however, such means usually tend to align the top layer of flakes, i.e., eliminate the desired random orientation. Accordingly, the thickness of the mat preferably is controlled by closely metering the flow of furnish from the forming heads.

The mat thickness used will vary depending upon such factors as the size and shape of the wood flakes, the particular technique used for forming the mat, the desired thickness and density of the mold wood product produced, the configuration of the molded wood product, and the molding pressure to be used.

Following the production of the felted mat 20 and placement of the mat within the cavity of bottom mold 13, the mat is compressed and cured under heat and pressure when top mold 12 slidably. engages bottom mold 13 as can be seen in FIG. 2. During this molding process, the top mold 12 comes almost into contact with bottom mold 13 at pinch trim edges 12*a* and 13*a* (leaving a space of about 0.030 inches), such that the excess of mat 20 is pinched off to form flashing/pinch trim portions 21. As the wood flakes are compressed and cured under heat and pressure between top mold 12 and bottom mold 13, the flakes bond together to form molded wood part 1 (FIG. 1).

The use of draft angles of ten degrees (10°) or larger surprisingly results in parts without edge blistering or springback from over densification of wood within the exterior edge portions. This is quite surprising since the mat 20 is compressed into a narrower and narrower space as one approaches pinch trim edges 12*a* and 13*a*. One would expect significantly increased density and pressure within the mat at such points, as compared to a part where a typical three-degree (3°) draft angle is used. Yet, as can be seen in Table 1, the density of the edge portion of part 1 is essentially no greater angle is ten degrees (10°) or greater than where the draft angle is only three degrees (3°)

The above description is that of the preferred embodiments only. Modifications of the invention will occur to those skilled in the art and to those who make or use the invention. Therefore, it is understood that the embodiment described above is merely for illustrative purposes and not intended to limit the scope of the invention, which is defined by the following claim as interpreted according to the principles of patent law, including the Doctrine of Equivalents.

The claimed invention is:

1. A method of molding a three dimensionally curved article formed from binder coated wood flakes comprising:

forming a loosely felted mat of said wood flakes;

depositing said mat onto a lower mold die;

compressing and heating said mat between an upper mold die and said lower mold die, said upper and lower mold dies forming a part defining mold cavity therebetween, wherein said part defining mold cavity has a perimeter which terminates where said upper and said lower mold dies come close to engaging at a pinch trim edge, which pinches off excess portions of said mat which extend beyond said pinch trim edges; and providing a draft angle of ten degrees or more over at least a portion of the edge of said part defining mold cavity, approaching said pinch trim edge.

2. The method of claim 1, wherein said draft angle is twenty degrees or more.

3. The method of claim 1, wherein said draft angle is thirty degrees or more.

4. The method of claim 1, wherein said draft angle is forty degrees or more.

5. The method of claim 1, wherein said draft angle is fifty degrees or more.

6. The method of claim 1, wherein said wood flakes have an average length of from about 1¼ to about 6.0 inches, an average thickness of from about 0.015 to about 0.25 inches, and an average width of less than the average length, and no greater than about 3.0 inches.

7. The method of claim 6, wherein said wood flakes of said mat have an average length of from about 2 to about 3 inches.

8. The method of claim 7, wherein said wood flakes of said mat have an average thickness of from about 0.015 to about 0.025 inches.

9. The method of claim 8, wherein said wood flakes of said mat have an average width of from about 0.25 to about 1.0 inches.

10. A three dimensionally curved article of manufacture formed from binder coated wood flakes, wherein said wood flakes are formed into a loosely felt mat, which is further deposited onto a lower mold die, and wherein said mat is compressed and heated between an upper mold die, and said lower mold die, and further wherein:

said upper and lower mold dies form a part defining mold cavity therebetween, and wherein said part defining mold cavity has a perimeter which terminates where said upper and said lower dies come close to engaging at a pinch trim edge, which pinches off excess portions of said mat which extend beyond said pinch trim edges; the edge of said article which approaches said pinch trim edge having a draft angle of ten degrees or more over at least a portion of said edge;

wherein said article is made from the method of claim 1.

11. The article of manufacture of claim 10, wherein said draft angle is twenty degrees or more.

12. The article of manufacture of claim 10, wherein said draft angle is thirty degrees or more.

13. The article of manufacture of claim 10, wherein said draft angle is forty degrees or more.

14. The article of manufacture of claim 10, wherein said draft angle is fifty degrees or more.

15. The article of claim 10, wherein said wood flakes having an average length of from about 1¼ to about 6.0 inches, an average thickness of from about 0.015 to about 0.25 inches, and an average width of less than the average length, and no greater than about 3.0 inches.

16. The article of manufacture of claim 15, wherein said wood flakes of said mat have an average length of from about 2 to about 3 inches.

17. The article of manufacture of claim 16, wherein said wood flakes of said mat have an average thickness of from about 0.015 to about 0.025 inches.

18. The article of manufacture of claim 17, wherein said wood flakes of said mat have an average width of from about 0.25 to about 1.0 inches.

19. An article of manufacture made from the method of claim 1.

* * * * *

UNITED STATES PATENT AND TRADEMARK OFFICE

CERTIFICATE OF CORRECTION

PATENT NO. : 6,756,105 B1
DATED : June 29, 2004
INVENTOR(S) : Bruce A. Haataja

It is certified that error appears in the above-identified patent and that said Letters Patent is hereby corrected as shown below:

Column 3,
Line 55, "fortyight" should be -- fortyeight --.
Line 60, "drafted" should be -- draft --.
Line 61, "suprising" should be -- surprising --.
Line 67, "structure integrety" should be -- structural integrity --.

Column 4,
Line 58, "use" should be -- used --.
Line 61, after "beech," insert -- birch --.
Line 63, "flake" should be -- flakes --.

Column 5,
Lines 1-2, "communicating" should be -- comminuting --.
Line 3, "fingerling are flake" should be -- fingerlings are flaked --.
Line 4, "flake" should be -- flakes --.
Line 5, "lengths and thickkness" should be -- lengths and thickness --.
Line 6, "flake" should be -- flakes --.

Column 6,
Line 51, "-trilsoccyanate" should be -- -triisocyanate --.
Line 53, "Sowalled" should be -- So-called --.

Column 7,
Line 1, "polyisocyantes" should be -- polyisocyanates --.
Line 25, "bending" should be -- blending --.

UNITED STATES PATENT AND TRADEMARK OFFICE

CERTIFICATE OF CORRECTION

PATENT NO. : 6,756,105 B1
DATED : June 29, 2004
INVENTOR(S) : Bruce A. Haataja

It is certified that error appears in the above-identified patent and that said Letters Patent is hereby corrected as shown below:

Column 8,
Line 23, "mold" should be -- molded --.
Line 29, after "slidably" delete ".".
Line 48, "is" should be -- than --.
Line 56, "claim" should be -- claims --.

Signed and Sealed this

Twenty-eighth Day of December, 2004

JON W. DUDAS
*Director of the United States Patent and Trademark Office*